United States Patent [19]

O'Hare

[11] Patent Number: 4,459,177
[45] Date of Patent: Jul. 10, 1984

[54] GROUND MOISTURE TRANSFER SYSTEM

[76] Inventor: Louis R. O'Hare, 1700 Banyan, #3, Fort Collins, Colo. 80526

[21] Appl. No.: 261,983

[22] Filed: May 8, 1981

[51] Int. Cl.³ .............................................. B01D 3/00
[52] U.S. Cl. ...................................... 203/10; 203/49; 203/DIG. 1; 202/234; 405/36; 165/45; 126/436
[58] Field of Search .................... 405/36, 37, 43, 229, 405/258; 165/45; 126/432, 436, 400; 202/234; 203/DIG. 1, 10, 49, 100; 34/93; 166/303

[56] References Cited

U.S. PATENT DOCUMENTS

| | | | |
|---|---|---|---|
| 956,058 | 4/1910 | Elten | 166/303 |
| 1,466,956 | 9/1923 | Peters | 405/43 |
| 2,421,528 | 6/1947 | Steffen | 166/303 X |
| 3,290,230 | 12/1966 | Kobayashi | 203/100 X |
| 3,528,251 | 9/1970 | Falk | 405/43 |
| 3,785,931 | 1/1974 | Coffey et al. | 203/DIG. 1 |
| 3,875,926 | 4/1975 | Frank | 203/DIG. 1 |
| 3,970,525 | 7/1976 | Kurek | 203/DIG. 1 |
| 4,159,228 | 6/1979 | Bellande et al. | 203/DIG. 1 X |
| 4,253,801 | 3/1981 | O'Hare | 165/45 X |
| 4,351,651 | 9/1982 | Courneya | 165/45 X |

Primary Examiner—Stephen J. Novosad
Assistant Examiner—Beverly E. Hjorth

[57] ABSTRACT

A method and an apparatus is disclosed in which solar heated air is drawn down a hole in the earth by a draft from a solar heated convection column located above the surface of the earth, the hot air being initially drawn downwards to a depth at which damp, moist earth is encountered with the hot air thereby evaporating water from the damp earth and producing water vapor and increasing the moisture content of the heated air and as this damp air is subsequently drawn back to the surface by the draft from the same solar heated convection column, it is allowed to contact cooled plates near the surface, the water vapor thereby condensing on the plates from which it is collected for irrigation or other purposes. In various embodiments either vertical or horizontal porous tubes in the ground contact the moist earth to bring the moisture of the earth into contact with the heated air flowing through the tube.

8 Claims, 15 Drawing Figures

GROUND MOISTURE TRANSFER SYSTEM

This invention is a type of solar still in that it removes water from damp earth by using heat to evaporate the water from the earth and then by condensing the water vapor on a cool surface. In this way it resembles the survival still that is used in the desert under extreme conditions to obtain drinking water from damp subsurface earth. In the case of the classic survival solar still, a hole is dug in the desert earth and a piece of transparent material such as plastic flexible sheet is stretched over the hole. A depression is then made in the center of this flexible plastic cover and a receptacle is placed under the point of the depression with the effect that when solar radiation evaporates water from the damp earth into the air intervening between the plastic and the earth, then the water vapor in the air condenses onto the underside of the plastic and courses down the plastic toward the center of the depression and drips into the receptacle. Like this traditional system which has saved many lives in desert regions by providing water from damp earth, this present invention also utilizes solar energy to remove moisture from damp earth by heating the earth and evaporating its water and then subsequently condensing the water vapor. However, in this present invention additional means are provided which greatly extend the usefulness of the concept. In this present invention means are provided for heating damp earth at a remote distance from the area of solar radiation impingement in order to bring water from damp ground deep in the earth. This invention makes available water from a source from which it would not ordinarily be available. It makes water available from damp earth deep in the ground. But not only does this invention make water available from such a source but it transports it to the surface or to an area near the surface. In this invention the method of transporting the heat downwards for the purpose of evaporating water from the earth or even from a pool is novel in that a draft from a solar heated convection column draws air from a solar heater downwards to the subterranean water and then draws the moisture laden air to the surface. This invention also provides an advantage in condensation cooling to more effectively remove the water from the moist air. In the case of this present invention the condensing surface is made cool not by ambient air as in the case of the plastic cover used in the survival art but rather the cooler subsurface earth removes the heat of condensation from the condensing plates. The principal object of this invention then is to provide water for irrigation and other purposes from damp earth located at a significant depth below the surface. Another object of the invention is to concentrate moisture diffusely distributed over a wide area of subsurface soil into smaller areas in order to provide in those smaller areas sufficient densities of moisture to enable the growth of plants and trees etc. Again another way of stating the objective of this invention is from the perspective of the energy to be used and in this sense the object is to use solar energy to transfer moisture from either deep in the earth or from an area in which it is widely diffused to a smaller area near the surface where it is thereby made readily available in sufficient concentration for plant growth or drinking purposes etc. Another object of the invention is to provide a single unit moisture transfer structure which can simply be lowered into a hole in the ground in order to bring moisture, that is found only at a considerable depth, closer to the surface area and in this way to provide a solar powered watering system for trees and other vegetation as well as potable water.

In previous applications a solar powered draft from an open ended convection column has been used to transport heat energy to various objects and for various other purposes, Forinstance in my copending application called, "Convection Powered Solar Engine" Ser. No. 184,205 solar heated air is drawn into a chamber to expand a bellows. Again in my copending application called, "Convection Powered Solar Food Dryer" of Ser. No. 234,970 hot air from a solar collector is drawn across drying food by a draft from an open ended, solar heated convection column. Another example is the use of a draft from a convection column to draw solar heated air through a water tank to heat the water in the tank even though the water tank may be at a lower elevation than either the column or the collector. This copending application is called, "Convection Powered Solar Heater for Water Tanks". This system of heat transport is also used in my copending application called, "Thermal Dielectric Power Generator" of Ser. No. 198,359 in which hot air is intermittantly drawn across temperature-variable capacitors. However, in this present application a solar heated convection column powers a draft that is used not only to transport heat energy but also to evaporate water and then to transport water vapor and finally to bring the vapor to a cool area for condensation in order to provide water in a different area.

Clarification of the basic method of this invention along with the structures which make the method operable can be seen in the following drawings.

FIG. 1 of the drawings illustrates a simple horizontal moisture transfer system with a solar collector and convection tower and a duct leading from a damp area to a dry area to be wetted.

FIG. 2 shows a collector and a column transporting moisture from a damp area below to a condensing water trap at a higher elevation.

FIG. 3a–FIG. 3e of the drawings show some component parts of a simple cylindrical transport system to be used for vertical transport of moisture. The components include the transparent glaze of a cylindrical collector with the black body absorber.

FIG. 4a–FIG. 4d of the drawings show other components of the cylindrical, vertical transport system depicting insulation collars and their positions.

FIG. 5 of the drawings shows the assembled components in their relative positions on the vertical moisture transport column.

Figure 1:
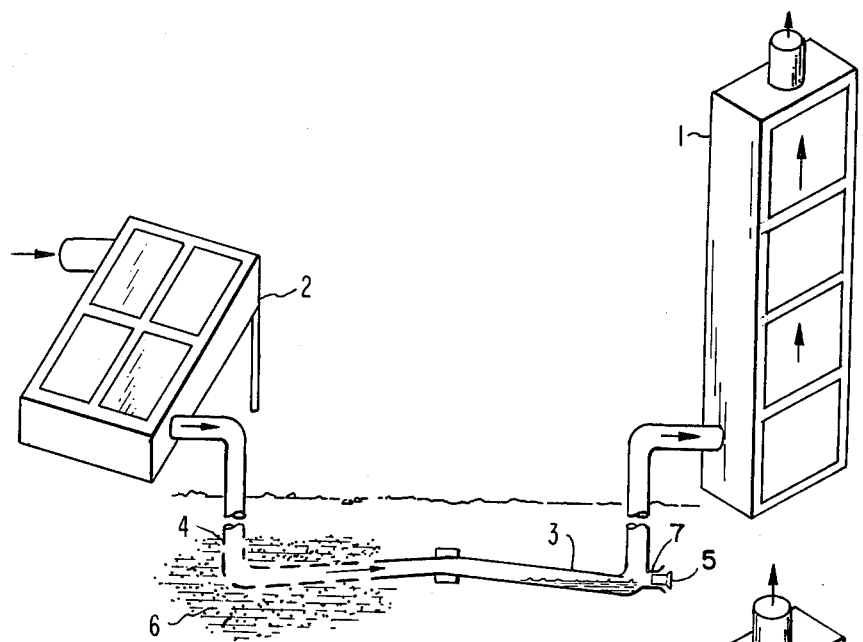

In FIG. 1, solar heated convection column 1 is an air-heating solar black box collector that is positioned with its length dimension in a vertical plane. Internally heated air rises from an inlet at the base to an exit at the top causing a draft at the base. This draft draws hot air from collector 2 through evaporation duct 4 into condensing duct 3. The duct 4 has small holes in the form of perforations or pores through which moisture from wet earth enters 4 by capillary action and soaking. The moisture is evaporated into the hot air stream in 4 and carried to duct 3 which is cooled by the surrounding earth, and the moisture of the airstream condenses in 3. The water formed by condensation in 3 may be removed from the bottom of 3 by a ladel or a pump or a siphon etc. These are not shown but are understood in the art. The water may also be removed by removing stopper 5 from exit duct 7. Any type of valve or porous material may be used in the place of this exit duct and the water may be drained into the earth. In this way water is transported from damp earth 6 horizontally to a position under duct 3.

Figure 2:
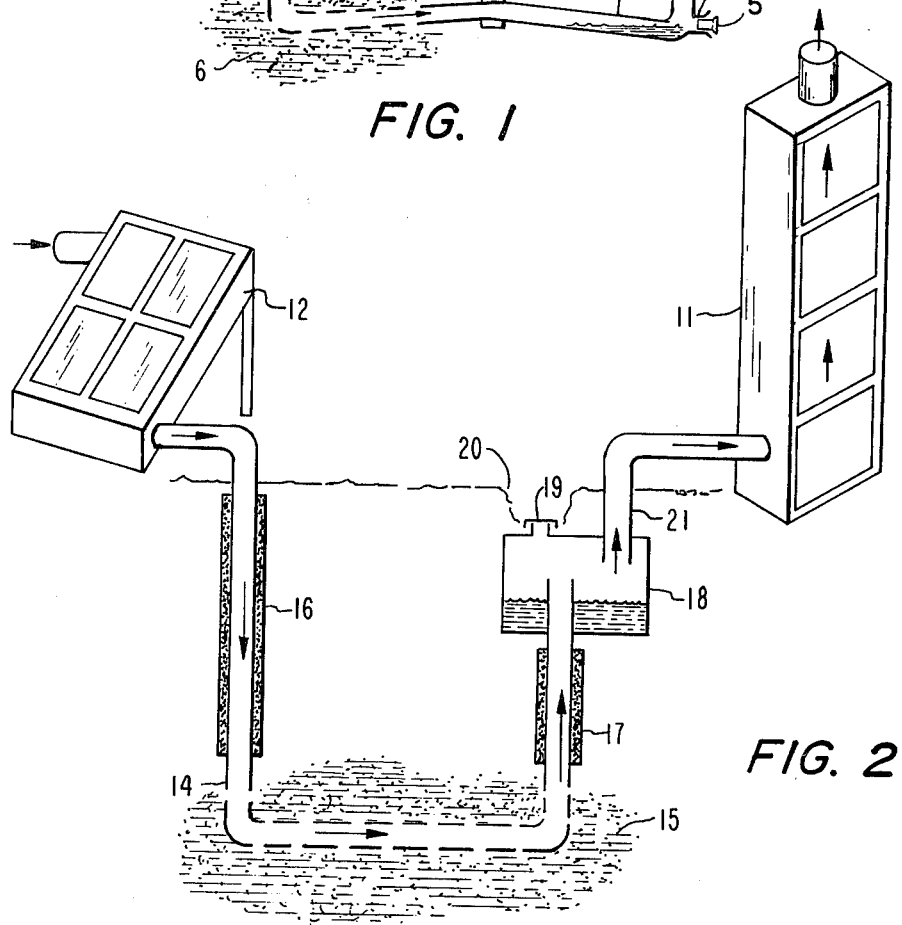

Referring then to FIG. 2 of the drawings, the solar heated convection column 11 is the same as the column 1 of FIG. 1. The draft produced at the base of 11 in this FIG. 2 draws hot air from solar collector 12 down to the damp earth deep in the ground through evaporation duct 14 which is made of porous material in its low area in which it traverses wet earth or pools of water shown by darkened area 15. The insulation 16 and 17 on the upper sections of duct 14 retain heat in the heated draft of air so that it will respectively have sufficient heat for evaporation purposes and not lose its water vapor prior to arriving at the condensing water trap 18. When moisture laden air is drawn through 18 it gives up its heat of condensation to the walls of 18 and the water vapor condenses filling 18. The water may be removed from 18 by opening pressure sealing cap 19 which is reached through a hole in the ground 20. When water is not being removed the cap must be replaced to assure that the draft is transmitted to the solar air heater. Other obvious means of water removal are not shown because they are well known in the are of water transport. These include draining the water into the soil through a faucet, or the use of a small hand pump or a siphon etc. The essential element of this FIG. 2 is the elevated position of the water chamber 18 whereby the energy of the convection column and the energy of the heat from the solar collector have operated to remove the water from the wet earth below and transport it to a level at which it is accessible. The duct 21 communicates the draft from convection column 11 to condensing chamber 18.

Figure 3A:
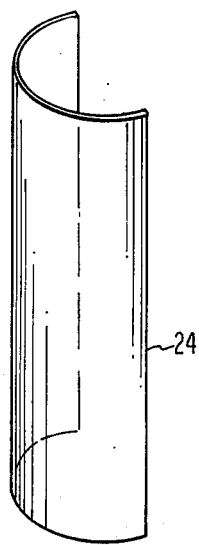
Figure 3B:
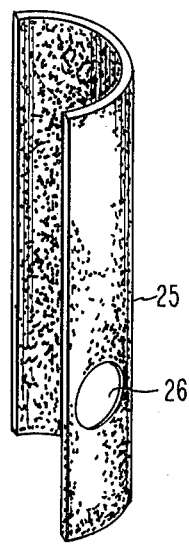
Figure 3C:
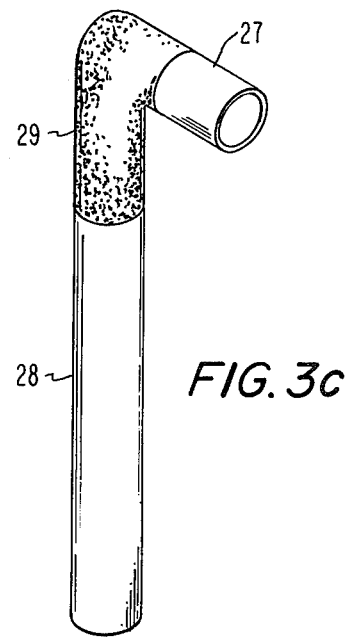
Figure 3D:
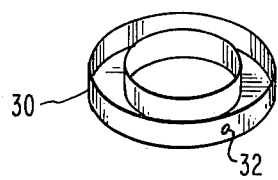
Figure 3E:
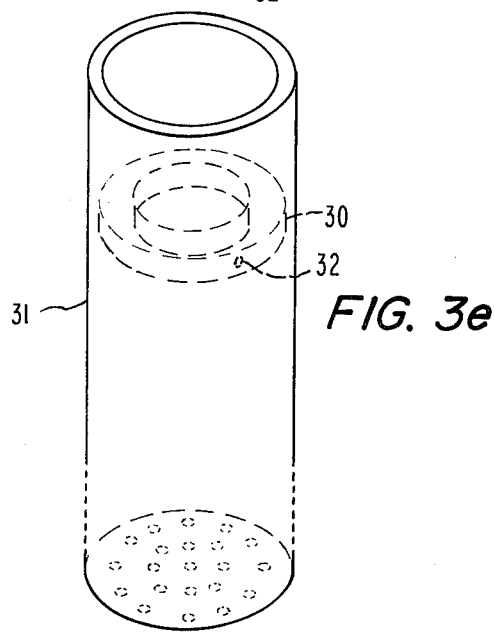
Figure 4A:
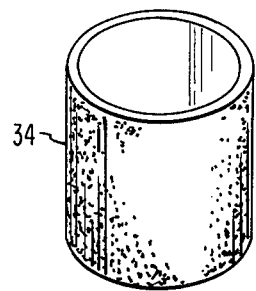
Figure 4B:
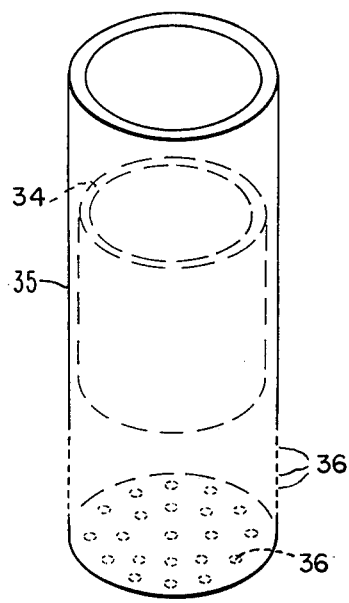

Referring then to FIG. 3 of the drawings, in the FIG. 3a the transparent glaze, which admits solar radiation both to produce heat within a cylinder-shaped collector and convection column, has a shape which forms approximately half of the wall of a cylinder that is divided along its length. This glaze 24 is shown opposite to the insulated black body collecting surface 25 of FIG. 3b. The glaze 24 and the insulated black surface 25, which has insulation over the outer part of its entire area, is also in the form of one half of a cylinder that has been divided along its length and it is able to form a complete cylindrical shape when joined along its length with the opposite half cylinder of glaze 24 in such a way that the concave sides of both 24 and 25 are facing eachother. Hole 26, projecting through the wall of 25, is for the purpose of receiving a small cylinder. FIG. 3c shows the small cylinder 27 which fits into hole 26 in such a way that when 27 is in place the long cylinder 28 extending downward from elbow 29 will be inside of and coaxial to the cylinder formed by the joining of 24 and 25. This inner cylinder 28 will extend downward and far below the lower limit of the cylinder formed by 24 and 25. The inner cylinder 28 will further extend for a great length into the cylinder 31 of FIG. 3e when the cylinder 31 is placed end to end with the cylinder formed by 24 and 25. The FIG. 3d shows a circular trough formed to receive condensing moisture. This trough 30 is placed inside of cylinder 31 of FIG. 3e in such a way that the outside surface of its outside cylindrical wall contacts the inside surface of the cylindrical wall of 31 so that any moisture condensing on the wall of 31 above 30 will drain into 30. An optional hole 32 in the outer wall of 30 aligns with a hole (also optional) in the wall of 31. In the FIG. 3e the cylinder 31 with its trough 30 in place is positioned into a deep hole in the earth which has wet earth or water at the bottom of the hole. The bottom surface of 31 is of porous or perforated material and it is made to contact the damp earth thereby moistening the inside of 31 at the bottom. Air, heated in the cylinder formed by 24 and 25 of FIGS. 3a and 3b when sunlight enters through 24 and warms 25, rises and draws air upwards through connected cylinder 31. The draft formed by the rising air draws heated air down cylinder 28. The warm air moving down 28 is heated at the top of 28 and in 27 and in elbow 29 as these elements are exposed to solar radiation and the heat formed within the solar collector area. However, the length of the convection column due to the height of 24 and 25 is significantly greater than the length of cylinder 28. The stronger upward convecting tendency of the cylinder composed of 24 and 25 draws heated air down 28 and up through 31. As the air moves it evaporates moisture at the base of 31 and receives water vapor into its air stream. This water vapor is maintained in the air atream by conserving the heat of the air in the stream until the air reaches an area close to the earth's surface. In that area the air is allowed to contact the cooled walls of cylinder 31 and the moisture condensing on the walls is collected by trough 30. Insulating collars shown in the following FIG. 4 are the means by which the heat is conserved in the air stream. Water may be removed from the trough 30 through optional holes such as the optional hole 32 which is drilled through 31 and the outer ridge of trough 30. Water leaving the transfer system at this point may be used to water the roots of trees and other vegetation by moistening the ground around them. In another embodiment instead of the optional holes water may be siphoned from trough 30 or pumped from it for other uses. Referring then to FIG. 4 of the drawings, the insulation collar 34 of FIG. 4a is placed in cylinder 35 of FIG. 4b. The cylinder 35 of FIG. 4b is the same as 31 of FIG. 3e but for clarity it is shown here without the trough. This collar 34 is placed in a position in the cylinder immediately below the trough shown in FIG. 3e and the insulation collar extends downwards along the inner wall of the cylinder to a position immediately above the perforated area at the bottom of 35. Pore holes 36 indicate the area at which moisture is admitted through porous surface or perforations.

Figure 4C:
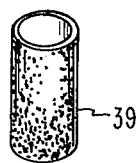
Figure 4D:
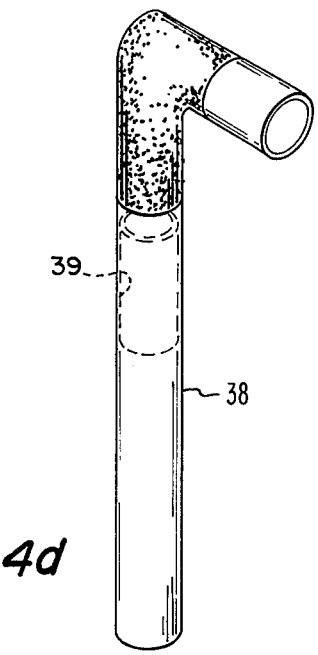

In the FIG. 4c the small collar of insulating material is placed inside the interior cylinder 38 or it may be placed around the outside of 38 at a position on 38 that is opposite the cool area near the top of 35. Since 28 of FIG. 3c is the same as 38 of this FIG. 4d, it is advantageous to to keep the heated air in 38 as warm as possible for evaporation purposes at the bottom of 35. But the air moving down 38 also warms some air rising in 35 through the heat transfered through the walls of 38. It is not necessary to transfer heat through the walls of 38 in the area in which cooling is taking place on the walls of 35, hence insulating collar 39 is useful in that position but it is not essential and it is optional.

Figure 5:
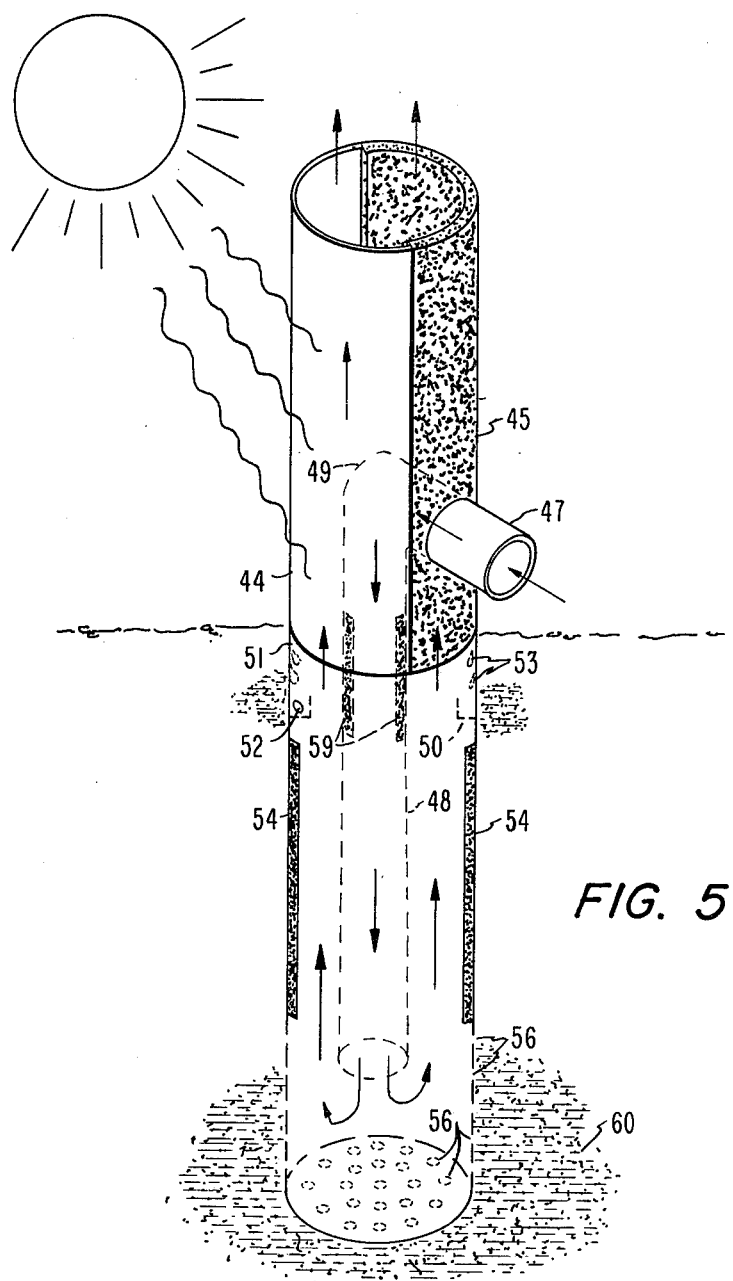

Referring then to FIG. 5 which shows the final composite relationship of the component parts shown in the previous two figures, the glaze 44 is the same as the glaze 24 of FIG. 3a and it is shown here in this FIG. 5 in its position immediately above the surface of the earth. The collecting surface for converting sunlight to heat together with its surrounding insulation 45 is the same as 25 of FIG. 3b and is shown here in FIG. 5 connected to 44 to form one cylinder which heats interior air and provides an upward convecting column of air within. Cylinder 47 is an air entry port and is the same as 27 of FIG. 3c. Air entering 47 in this FIG. 5 is heated by elbow 49 which is the same as elbow 29 of FIG. 3c. The air is also heated by the upper part of small cylinder 48 which is the same as the small cylinder 28 of FIG. 3c. In this FIG. 5 the heated air is carried down 48 to the bottom of surrounding cylinder 51 which is the same as the cylinder 31 of FIG. 3e. The perforations 56 at the bottom of 51 allow moisture from the damp or wet surrounding earth to enter 51 and be evaporated by the hot air stream being drawn down 48 by the draft formed at the base of the cylinder formed by 44 and 45 when the hot air rises within the cylinder formed by 44 and 45. The insulation 54 is a jacket the same as the insulation jacket 34 of FIGS. 4a and 4b which maintain the heat and moisture content of the air stream rising in cylinder 51 of this FIG. 5. In this same FIG. 5 the trough 50 receives condensed drops 53 which form on the inner walls of 51 when the moist rising air reaches this level and is cooled here by the cool walls of 51 since the walls of 51 do not have insulation at this area and the walls can transfer the heat of condensation to the surrounding earth. The optional hole 52 is the same as the optional hole 32 of FIG. 3d and it exits water from trough 50 to the surrounding soil. The trough 50 is the same as trough 30 of FIG. 3d. The optional insulating collar 59 is the same as the optional insulating collar 39 of FIGS. 4c and 4d. The moisture 60 shown by the darkened area at the base of cylinder 51 is transfered to moisture at higher level 61 indicated by the darkened area at the top of 51.

Figure 6:
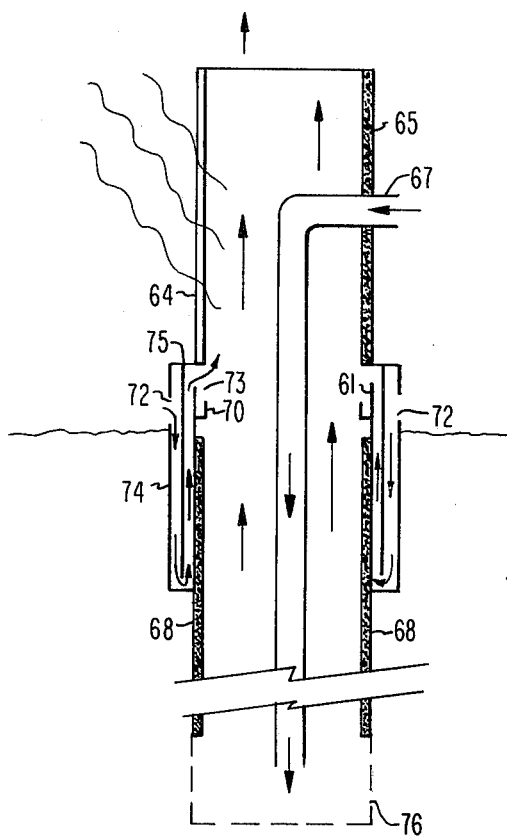
FIG. 6 shows a cross sectional diagram of a cylinder with concentric chambers used to cool air beneith the surface and to use the cooled air to provide condensation above the earth's surface.

In FIG. 6 the elements are nearly all the same as in FIG. 5 with the following few exceptions. The FIG. 6 shows a cross sectional view of most of the elements shown in FIG. 5. In FIG. 6 there is shown an additional means of providing condensation of the water vapor above ground level to facilitate the recovery of water from the wet earth below. According to FIG. 6 solar energy enters glaze 64 which corresponds to 44 of FIG. 5. The black surface converter changing light to heat together with its insulation 65 is the same as 45 of FIG. 5 Inlet duct 67 corresponds to 47 of FIG. 5 and cylinder 61 corresponds to 51 of FIG. 5. Insulation 68 is the same as insulation 54 of FIG. 5 and trough 70 is the same as trough 50 of FIG. 5. The holes for moisture entry 76 in this FIG. 6 are the same as the perforations and pore holes 56 of FIG. 5. Other operating elements of the system shown by FIG. 6 have the same structure and function as their counterparts of FIG. 5 except for cylinder jackets 74 and 75 and the openings in these jackets 72 and 73. Air is drawn through hole 72 in jacket 74. This jacket and the air that is drawn into it is cooled by the subsurface earth surrounding 74. The cooled air is then drawn through a channel between jacket 75 and cylinder 61, cooling 61 and removing the heat of condensation from this area of 61 enabling water vapor to condense from the air stream rising from 61. Since the air that cools the top of 61 is cooled below ground level and then drawn up to cool an area of 61 above ground level, the trough 70 receiving the condensed water is also located above ground level in the embodiment of this drawing. The water may be drained through an optional hole in the trough like the optional hole 52 shown in FIG. 5. The draft that draws in the cooling air enters the hole 72 is drawn through 74 and 75 and is drawn out hole 73 by the air rising in 61.

Figure 7:
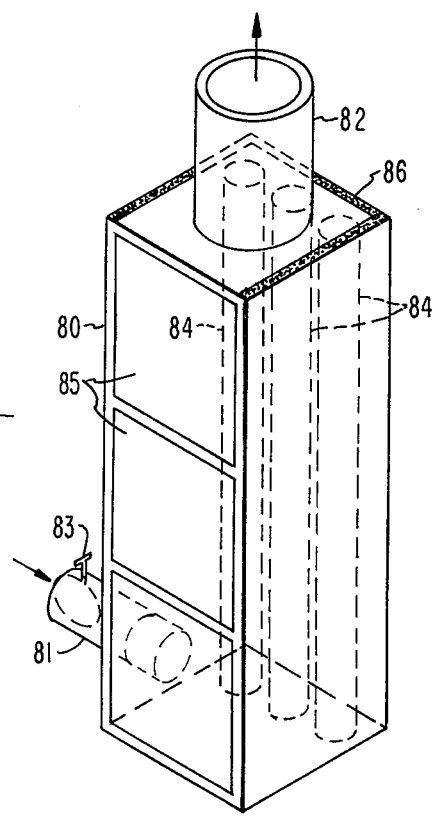
FIG. 7 shows a solar heated convection column with heat storage.

Referring then to FIG. 7, the solar heated convection column 80 is a black box solar collector with its length positioned vertically and having an inlet and an exit duct 81 and 82 respectively. The air heated within by solar light absorbtion on the black surfaces within causes the air within to tend to rise. The position of the air valve 83 determines whether and to what degree the air within will rise and convection will take place. The thermal mass, heat storage cylinders 84 within the convection column 80 are also heated by solar energy entering through the transparent glaze 85. The cylinders 84 may represent any material capable of holding heat energy such as rocks etc. In one embodiment the cylinders contain thermal storage material in the form of eutectic salts such as glauber's salts. In another embodiment the thermal storage material in the cylinders is parafin or similar hydrocarbon material which releases heat during change of state from a liquid to a solid. Similarily, the heat storage material in another embodiment is water. By the use of heat storage within the convection column and stopping air flow through the column by closing valve 83 convection may later be produced during periods of darkness by opening 83. Opening 83 very late at night or in the dark hours of the morning will produce a draft at inlet duct 81. This draft is then used to draw cool damp air through ducts in the cooled earth allowing the moisture in the air to condense in the ducts. The insulation 86 helps conserve storage heat.

Figure 8:
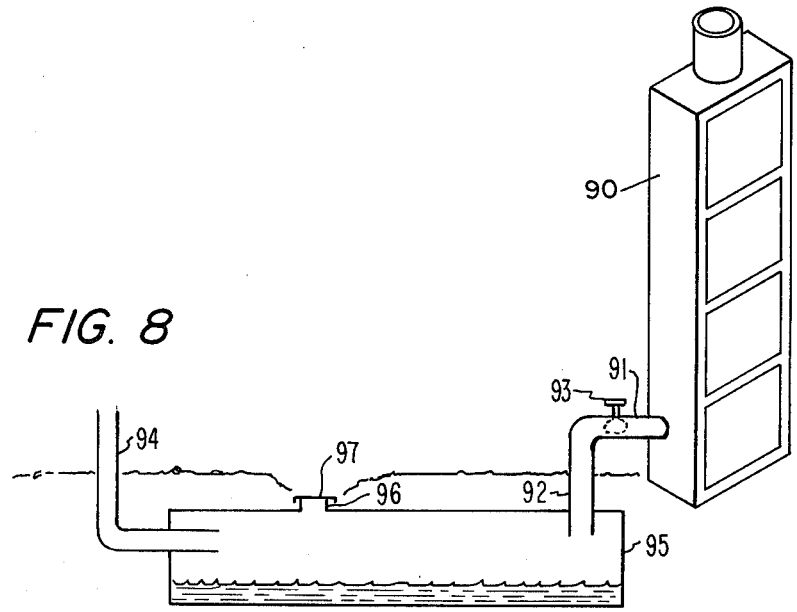
FIG. 8 shows a ground moisture transfer in which air moisture at night is transferred to the ground.

Referring then to FIG. 8 of the drawings, the solar heated convection column 90 has thermal storage capacity as the one described in FIG. 7. The heat storage capacity is charged during daylight hours in which there is good solar incidence by closing valve 93 to prevent convection current in 90 from producing a draft. During the night hours of dew formation valve 93 is opened. The air heated by the storage in 90 rises in 90 producing a draft in duct 91 drawing air through duct 92 and duct 94. The moisture in the air condenses in porous duct 94 to water the earth in one embodiment. In another embodiment the pores in 94 are sealed and the moisture in the night air is condensed in condensing chamber 95 and water is subsequently removed from 95 through water removal port 96 by removing pressure sealing cap 97. The condensing chamber 95 is a tank or a pipe located below the surface of the earth or in another cool place.

In the various drawings the means of moving the air is shown as a convection column which moves air by producing a draft or low pressure area at its base. Air and moisture in the elements of the system are caused to move toward the low pressure area because of the pressure differential. Otherwise stated, air and moisture are drawn through the system by the draft produced by the convection column. However, the inventive concept is not intended to be limited to a single means of air movement nor to a particular form or type of heater nor condenser. For instance, in an alternate embodiment a small electric fan powered by a solar electric cell is used to move the heated air through the system in place of the solar powered convection column. Similarly, alternate heat sources are adaptable for both heating the air that causes evaporation as well as for powering the convection column. Combustion type air heaters can be used for this purpose as well as geothermal heat sources. In the case of geothermal heat a duct leading air from the surface of the earth through a hot subsurface area would then conduct hot air to a porous pipe in wet ground. From there a duct would conduct the damp air to a a region of cooler earth in which the moisture would condense from the air. The power to drive this air stream could be the draft from a column contacting hot earth and extending upwards above the surface to produce energetic convection. Just as it is not intended to limit the inventive concept to a single heat source, neither is the cooling means to be limited to a single mode of heat removal for purposes of condensation. In the embodiments in which the water vapor from damp night air is condensed, the convection column with thermal storage is used to draw air through condensing ducts on the earth's surface, cooled by radiation heat loss, and condensing water vapor for distribution to vegetation through the perforations in the ducts.

I claim:

1. A ground moisture transfer system in which the moisture in the earth is transfered from one area to another comprising:
    (1) a solar powered air stream heating means capable of heating air to a temperature at which water will readily evaporate, said air stream heating means being in the form of a separate air heating solar collector and,
    (2) a ground moisture evaporation means in fluid flow communication with said air stream heating means by ducting, said evaporation means being capable of contacting an area of subterranean wet earth with heat by a stream of heated air flowing through perforated ducting and being capable of receiving water vapor into the heated air stream when the heated air contacts the wet earth through the perforations in the ducting and evaporates moisture into the air stream and,
    (3) water vapor condensing and collecting means in the form of a cooled surface in serial fluid flow communication by ducting with the ground moisture evaporation means and the air stream heating means, said water condensing means being capable of contacting said moisture laden air stream and also being capable of directing condensed water to a receptacle by water ducting and,
    (4) heat and air transport means in the form of a separate solar heated convection column, open on the top and connected to ducting at its base in which a draft of air is produced that draws air from the air heating means to the evaporation means and then to the condensation and water collecting means, said heat and air transport means being capable of moving an air stream in said ducting from said air heating collector to said water evaporation means and then to said water condensing and collecting means.

2. A ground moisture transfer system as in claim 1 in which the water vapor condensing and water collecting means is a duct placed in a subsurface area said duct being on an approximately horizontal plane and having a slightly downward slope to provide a gravity flow to direct condensing water and having a water removal port in a lower area of the duct.

3. A ground moisture transfer system as in claim 1 in which the cooled surface of the water vapor condensing and collecting means is a subsurface chamber located in a cool area, said chamber having inlet and exit ports for the passage of damp air and also having a removable sealing cap at the top of the chamber for periodic water removal.

4. A ground moisture transfer system as in claim 1 in which the solar collector of the air stream heating means is a separate cylindrical duct within a cylindrical, solar collecting convection column, with said cylindrical duct air stream heating means having an air inlet port extending through the wall of the cylindrical, solar heated convection column with the elevation of said inlet port being at a lower level than the top of said convection column and,
    as in claim 1 in which the ground moisture evaporation means is a perforated and porous section at the bottom, closed end of a cylindrical duct extending into the earth and in physical contact with wet earth with said porous section being capable of receiving hot air from an inner coaxial duct which is a downward extension of the duct that forms the air heating means and, as in claim 1 in which the water vapor condensing and water collecting means is a remote and cooled area on the inner wall of the same cylinder whose end section is the evaporation means and said cooled area being a portion of the length of the cylinder at the lower end of which portion is a circular trough extending around the inner circumference of the cylinder and so positioned as to receive condensing water droplets draining from the side of this cylinder which is in contact with cool surrounding subsurface earth around its outer wall and, as in claim 1 in which the heat and air transport means is a cylindrical convection column placed open end to open end with, and having the same diameter as, the cylinder which is the condensation means and said cylindrical convection column being connected to the top of said cylindrical condenser to provide upward fluid flow between the two and said cylindrical convection column being composed of two half cylinders divided along their lengths, the one half being of transparent glaze to admit solar radiation to the inside of the cylinder and the other half having a black inner surface with insulation and thereby being capable of producing an upward draft at its base to draw heated air through said evaporation and condensation means.

5. A ground moisture transfer system as in claim 1 in which the air stream heating means is a cylindrical duct within a cylindrical solar collecting convection column with said cylindrical duct heating means having an air inlet port extending through the wall of the cylindrical solar heated convection column with the elevation of said inlet port being at a level lower than the top of the said convection column and,
    as in claim 1 in which the ground moisture evaporation means is a perforated and porous section at the bottom closed end of a cylindrical duct extending into the earth and in physical contact with wet earth with said porous section being capable of receiving hot air from an inner coaxial duct which is a downward extension of the duct that forms the air heating means and,
    as in claim 1 in which the water vapor condensing and water collecting means is a remote and cooled area on the inner wall of the same cylinder whose end section is the evaporation means and said cooled area being a portion of the length of the cylinder at the lower end of which portion is a circular trough extending around the inner circumference of the cylinder so positioned as to receive condensing water droplets draining from the side of this cylinder which is enclosed by two concentric cylindrical chambers with a portion of the length of each of the chambers extending below the earth's surface and a part of the length of each extending above the surface, each of the two chambers being joined to the other at their bases by an opening at the base of the wall that separates the chambers, and the inner enclosing chamber having openings at its top which extend into the column of upward convecting air and the outer wall of the outer chamber having openings for air inlet that admit air to the subsurface area of the outer chamber and, as in claim 1 in which the heat and air transport means is a cylindrical convection column placed open end to open end with and having the same diameter as the cylinder which is the condensation means and said convection column being connected to the top of said cylindrical condenser and with said convection column cylinder being composed of two halves, each half being the half of a cylinder divided along its length, the one half being of transparent glaze the other half having a black light absorbing surface surrounded by insulation.

6. A ground moisture transfer system transferring moisture from the air to the earth comprising:
(1) water vapor condensation means in the form of ducting located in a cool place in the earth and through which damp air is circulated and from which condensed water is exited onto the earth and,
(2) air circulation means by which moist air is moved through the ducting that is located in a cool place in the earth, said air circulation means being in the form of a solar heated convection column having thermal storage in the form of thermal mass which is heated by solar heat during daylight hours, said thermal mass being capable in turn of heating air at night within a single convection column to therby produce a draft at the base of said column and to thereby draw the damp air across said condensation means, said circulation means having also insulation to retard undesireable heat loss and a valve to regulate volume of air flow.

7. A method of ground moisture transfer comprising:
(1) Heating air by means of a separate solar air heating collector,
(2) Moving solar heated air through perforated ducting through a source of ground moisture such as wet earth and pools of water by the use of a draft from a solar heated convection column which is capable of drawing air from said solar air heating collector and through the ducting,
(3) Contacting the moisture of the damp earth with the hot streaming air from the solar collector that is moved through said perforated ducting and thereby evaporating moisture into the air stream,
(4) Condensing and collecting the water from the air stream by drawing the air stream across surfaces located in a cool place in the earth.

8. A method of ground moisture transfer for transferring moisture from the air to the ground during periods of negligible air movement comprising:
(1) Producing an energetic draft at the base of a single open ended convection column by heating the column with solar heated thermal mass,
(2) Drawing moisture laden air across cooled surfaces located in the cool earth by the use of the draft from the convection column heated by the solar heated thermal mass,
(3) Condensing and collecting the water from the cooled surfaces.

* * * * *